United States Patent
Sung et al.

(10) Patent No.: US 11,125,133 B2
(45) Date of Patent: Sep. 21, 2021

(54) HYDROGEN-ASSISTED INTEGRATED EMISSION CONTROL SYSTEM

(71) Applicant: BASF CORPORATION, Florham Park, NJ (US)

(72) Inventors: Shiang Sung, New York, NY (US); Torsten Neubauer, Langenhagen (DE); Pushkaraj R. Patwardhan, Morganville, NJ (US); Susanne Stiebels, Adenbuettel (DE); Claudia Zabel, Hannover (DE)

(73) Assignee: BASF CORPORATION, Florham Park, NJ (US)

( * ) Notice: Subject to any disclaimer, the term of this patent is extended or adjusted under 35 U.S.C. 154(b) by 56 days.

(21) Appl. No.: 16/500,340

(22) PCT Filed: Apr. 3, 2018

(86) PCT No.: PCT/IB2018/052305
§ 371 (c)(1),
(2) Date: Oct. 2, 2019

(87) PCT Pub. No.: WO2018/185665
PCT Pub. Date: Oct. 11, 2018

(65) Prior Publication Data
US 2021/0102486 A1    Apr. 8, 2021

Related U.S. Application Data

(60) Provisional application No. 62/481,406, filed on Apr. 4, 2017.

(51) Int. Cl.
*F01N 3/08*    (2006.01)
*F01N 3/10*    (2006.01)
(Continued)

(52) U.S. Cl.
CPC ......... *F01N 3/2066* (2013.01); *B01D 53/944* (2013.01); *B01D 53/9418* (2013.01);
(Continued)

(58) Field of Classification Search
CPC .............. B01D 53/9418; B01D 53/944; B01D 2251/202; B01D 2257/404;
(Continued)

(56) References Cited

U.S. PATENT DOCUMENTS 3,030,181 A    4/1962 Milton
4,440,871 A    4/1984 Lok et al.
(Continued)

FOREIGN PATENT DOCUMENTS

CN    102388207 A    3/2012
CN    104023843 A    9/2014
(Continued)

OTHER PUBLICATIONS

"Ammonia for fuel update," New Energy and Fuel, Blog entry published Oct. 18, 2011; available on-line at https://newenergyandfuel.com/http:/newenergyandfuel/com/2011/10/18/ammonia for fuel. (Year:2011).*
(Continued)

*Primary Examiner* — Timothy C Vanoy
(74) *Attorney, Agent, or Firm* — Finnegan, Henderson, Farabow, Garrett & Dunner, LLP

(57) ABSTRACT

The invention provides an emission control system for treatment of an exhaust gas stream that includes an oxidation catalyst composition disposed on a substrate in fluid communication with the exhaust gas stream; at least one selective catalytic reduction (SCR) composition disposed on a substrate downstream from the oxidation catalyst composition, and a hydrogen injection article configured to introduce hydrogen into the exhaust gas stream upstream of the
(Continued)

oxidation catalyst composition or downstream of the oxidation catalyst composition and upstream of the at least one SCR composition. The invention also provides a method of treating an exhaust gas stream, the method including receiving the exhaust gas stream into the emission control system of the invention and intermittently introducing hydrogen upstream of the oxidation catalyst article or downstream of the oxidation catalyst article and upstream stream of the SCR article.

28 Claims, 6 Drawing Sheets

(51) Int. Cl.
  F01N 3/20        (2006.01)
  F01N 3/28        (2006.01)
  B01J 21/04       (2006.01)
  B01J 23/58       (2006.01)
  B01J 23/656      (2006.01)
  B01J 29/76       (2006.01)
  B01J 35/00       (2006.01)
  B01J 35/04       (2006.01)
  B01D 53/94       (2006.01)

(52) U.S. Cl.
  CPC ..... B01D 53/9472 (2013.01); B01D 53/9477 (2013.01); B01J 21/04 (2013.01); B01J 23/58 (2013.01); B01J 23/6562 (2013.01); B01J 29/763 (2013.01); B01J 35/0006 (2013.01); B01J 35/04 (2013.01); F01N 3/0835 (2013.01); F01N 3/103 (2013.01); F01N 3/2825 (2013.01); B01D 2255/1021 (2013.01); B01D 2255/1023 (2013.01); B01D 2255/1025 (2013.01); B01D 2255/2042 (2013.01); B01D 2255/2073 (2013.01); B01D 2255/20715 (2013.01); B01D 2255/20761 (2013.01); B01D 2255/50 (2013.01); B01D 2255/904 (2013.01); B01D 2255/9032 (2013.01); B01D 2255/911 (2013.01); B01D 2255/9155 (2013.01); B01D 2255/9202 (2013.01); B01D 2255/9205 (2013.01); F01N 2330/02 (2013.01); F01N 2330/06 (2013.01); F01N 2330/30 (2013.01); F01N 2370/04 (2013.01); F01N 2610/04 (2013.01); F01N 2610/1453 (2013.01)

(58) Field of Classification Search
  CPC ........ B01D 2257/402; B01D 2258/012; F01N 3/103; F01N 3/2066; F01N 3/2073; F01N 2370/02; F01N 2370/04; F01N 2570/14; F01N 2570/145; F01N 2570/10; F01N 2570/12; F01N 2610/04
  See application file for complete search history.

(56) References Cited

U.S. PATENT DOCUMENTS

| | | | |
|---|---|---|---|
| 4,544,538 A | 10/1985 | Zones | |
| 5,272,871 A | 12/1993 | Oshima et al. | |
| 5,407,761 A | 4/1995 | Ovshinsky et al. | |
| 6,162,415 A | 12/2000 | Liu et al. | |
| 6,171,556 B1 | 1/2001 | Burk et al. | |
| 6,193,929 B1 | 2/2001 | Ovshinsky et al. | |
| 6,709,644 B2 | 3/2004 | Zones et al. | |
| 7,229,597 B2 | 6/2007 | Patchett et al. | |
| 7,264,789 B1 | 9/2007 | Verduijn et al. | |
| 7,704,475 B2 | 4/2010 | Bull et al. | |
| 7,998,423 B2 | 8/2011 | Boorse et al. | |
| 8,293,182 B2 | 10/2012 | Boorse et al. | |
| 8,404,203 B2 | 3/2013 | Bull et al. | |
| 8,475,722 B2 | 7/2013 | Nakanishi et al. | |
| 9,011,807 B2 | 4/2015 | Mohanan et al. | |
| 9,017,626 B2 | 4/2015 | Tang et al. | |
| 9,242,238 B2 | 1/2016 | Mohanan et al. | |
| 9,321,042 B2 | 4/2016 | Hoke et al. | |
| 9,352,307 B2 | 5/2016 | Stiebels et al. | |
| 9,453,443 B2* | 9/2016 | Kumar | F01N 3/035 |
| 9,517,456 B2 | 12/2016 | Patchett et al. | |
| 9,757,717 B2 | 9/2017 | Patchett et al. | |
| 10,502,109 B2* | 12/2019 | Keturakis | F01N 3/106 |
| 2001/0049339 A1 | 12/2001 | Schafer-Sindlinger et al. | |
| 2002/0002905 A1 | 1/2002 | Umino et al. | |
| 2002/0166546 A1 | 11/2002 | Andrews et al. | |
| 2004/0241507 A1 | 4/2004 | Schubert et al. | |
| 2007/0079600 A1* | 4/2007 | Bartley | B01D 53/9409 60/283 |
| 2007/0246351 A1 | 10/2007 | Smola et al. | |
| 2007/0274892 A1 | 11/2007 | Duvinage et al. | |
| 2008/0003470 A1 | 1/2008 | Christenson et al. | |
| 2008/0131345 A1* | 6/2008 | Vitse | F01N 3/106 423/239.1 |
| 2008/0196588 A1 | 8/2008 | Gretta et al. | |
| 2008/0256932 A1 | 10/2008 | Duvinage et al. | |
| 2008/0257751 A1 | 10/2008 | Smola et al. | |
| 2008/0274873 A1 | 11/2008 | Schubert | |
| 2009/0107116 A1 | 4/2009 | Barber et al. | |
| 2009/0263296 A1 | 10/2009 | Taques | |
| 2009/0285740 A1 | 11/2009 | Sobolevskiy et al. | |
| 2010/0024403 A1 | 2/2010 | Johannessen et al. | |
| 2010/0024542 A1 | 2/2010 | Yen et al. | |
| 2010/0186375 A1 | 7/2010 | Kazi et al. | |
| 2010/0251700 A1 | 10/2010 | Wan et al. | |
| 2010/0284875 A1* | 11/2010 | Koermer | B01D 53/9409 423/237 |
| 2011/0008694 A1 | 1/2011 | Tange et al. | |
| 2011/0236790 A1 | 9/2011 | Schubert | |
| 2012/0258032 A1 | 10/2012 | Phillips et al. | |
| 2013/0047584 A1 | 2/2013 | Park | |
| 2014/0363358 A1 | 12/2014 | Udd et al. | |
| 2016/0136626 A1 | 5/2016 | Phillips et al. | |
| 2016/0230255 A1 | 8/2016 | Young et al. | |
| 2016/0298514 A1 | 10/2016 | Raux | |
| 2016/0310897 A1 | 10/2016 | Tsuji et al. | |
| 2016/0340182 A1 | 11/2016 | Hosono et al. | |
| 2016/0348556 A1 | 12/2016 | Suyama | |
| 2019/0242282 A1* | 8/2019 | Li | B01D 53/94 |

FOREIGN PATENT DOCUMENTS

| | | |
|---|---|---|
| CN | 205618233 U | 10/2016 |
| DE | 4103668 | 8/1992 |
| EP | 0640378 | 3/1995 |
| EP | 2230001 | 9/2010 |
| FR | 2941499 | 7/2011 |
| GB | 868846 | 5/1961 |
| JP | H06146873 | 5/1994 |
| JP | 2006136776 | 6/2006 |
| JP | 2010203335 | 6/2006 |
| JP | 2010203335 | 9/2010 |
| KR | 970070445 | 11/1997 |
| KR | 20050115420 | 12/2005 |
| KR | 20100098143 | 9/2010 |
| KR | 101076841 | 10/2011 |
| KR | 101553587 | 9/2015 |
| WO | WO2014073576 | 5/2014 |
| WO | WO2015145181 | 10/2015 |
| WO | WO2016034401 | 3/2016 |
| WO | WO2016070090 | 5/2016 |
| WO | WO2016138418 | 9/2016 |
| WO | WO2017019958 | 2/2017 |
| WO | WO2018185661 | 10/2018 |

OTHER PUBLICATIONS

William I. F. David, Joshua W. Makepeace, Samantha K. Callear, Hazel M. A. Hunter, James D. Taylor, Thomas J. Wood, Martin O.

(56) References Cited

OTHER PUBLICATIONS

Jones "Hydrogen production from ammonia using sodium amide" J. Am. Chem. Soc., 2014, 136 (38). (Year: 2014).*
"Ammonia for fuel update" New Energy and Fuel, Blog entry published Oct. 18, 2011; available online at https://newenergyandfuel.com/http:/newenergyandfuel/com/2011/10/18/ammonia. (Year: 2011).*
"Why on-board hydrogen generators won't boost your mileage," Blog entry published Aug. 4, 2008; available at https://www.autoblog.com/2008/08/04/why-on-board-hydrogen-generators-wont-boost-your-mileage/.
Alfred K. Hill, Laura Torrente-Murciano; "Low temperature $H_2$ production from ammonia using ruthenium-based catalysts: Synergetic effect of promoter and support," Applied Catalysis B: Environmental 172-173 (2015) 129-135.
N. Itoh, A. Oshima, E. Suga, T. Sato; "Kinetic enhancement of ammonia decomposition as a chemical hydrogen carrier in palladium membrane reactor," Catalysis Today 236 (2014) 70-76.
Irena Short, Ashok Sahgal, Walter Hayduk, "Solubility of ammonia and hydrogen sulfide in several polar solvents,", J. Chem. Eng. Data 1983, v28(1), 63-66.
Supplementary European Search Report for corresponding EP 18 78 1697 dated Jul. 23, 2020 (2 pages).
International Search Report for corresponding PCT/IB2018/052305 dated Jul. 24, 2018 (2 pages).
International Preliminary Report on Patentability for corresponding PCT/IB2018/052305 dated Oct. 28, 2019 (15 pages).
Kim et al. "Development on New Catalyst Technology for Compact SCR Modularization for Ship," The Korean Society and Engineering Chemistry 2016 Spring Meeting (5 pages).
Office Action from Chinese Patent Office for corresponding CN Application No. 201880036856.0, dated Apr. 14, 2021.

* cited by examiner

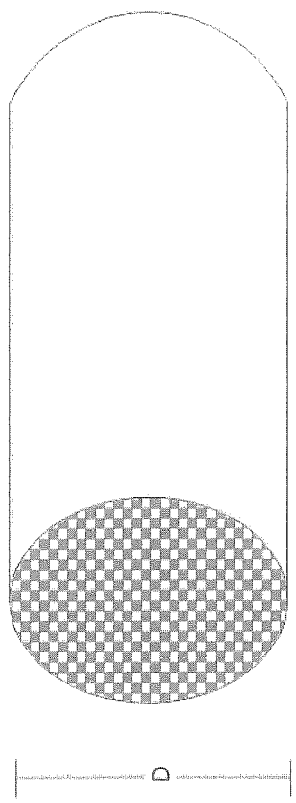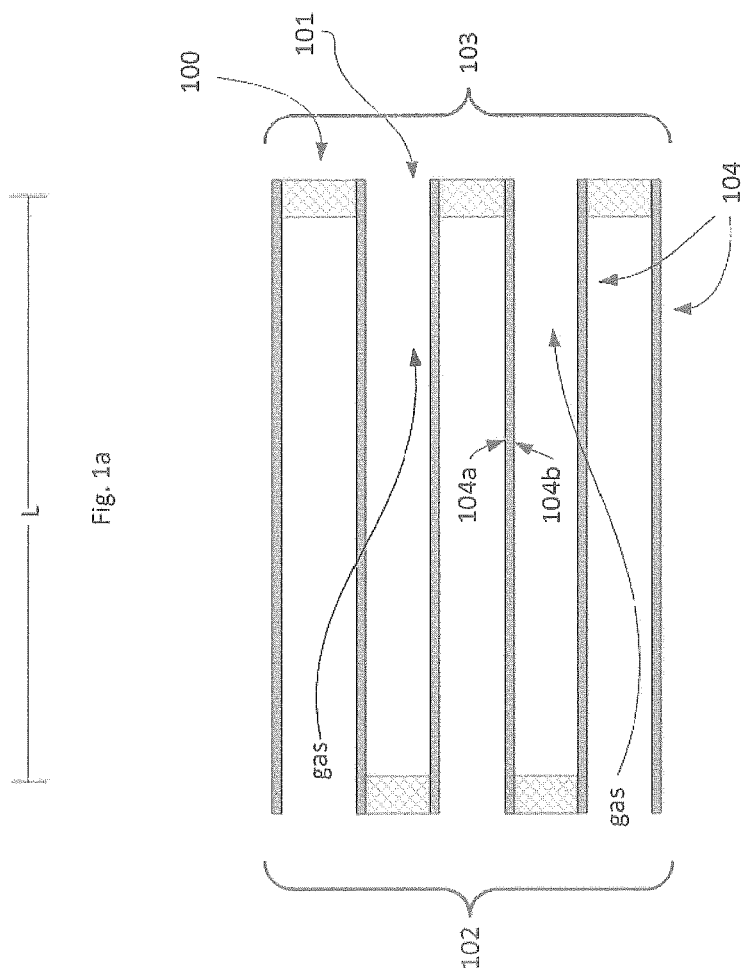
Fig. 1a
Fig. 1b

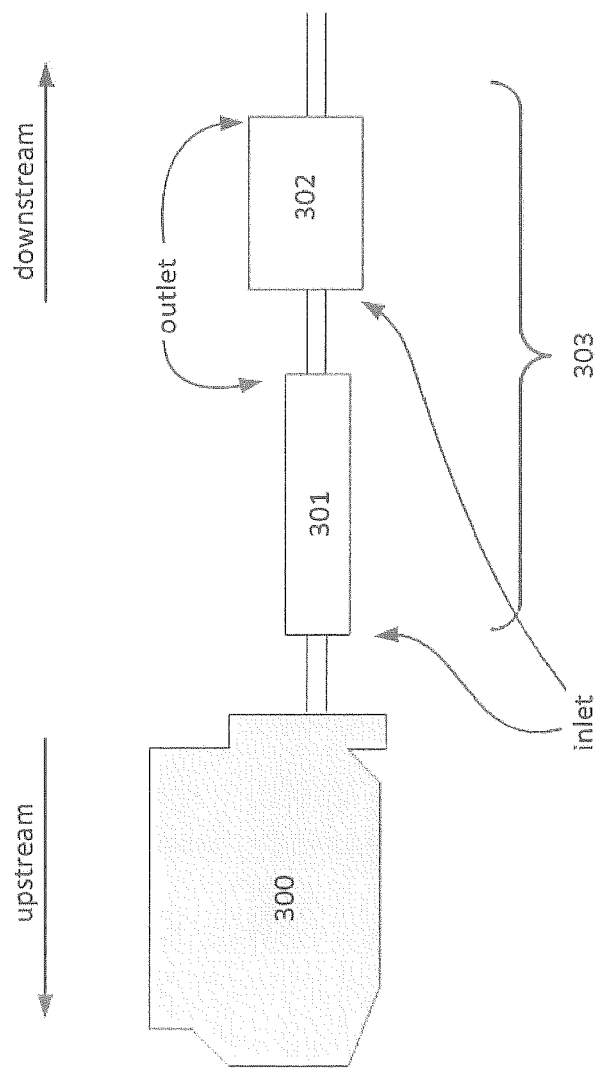

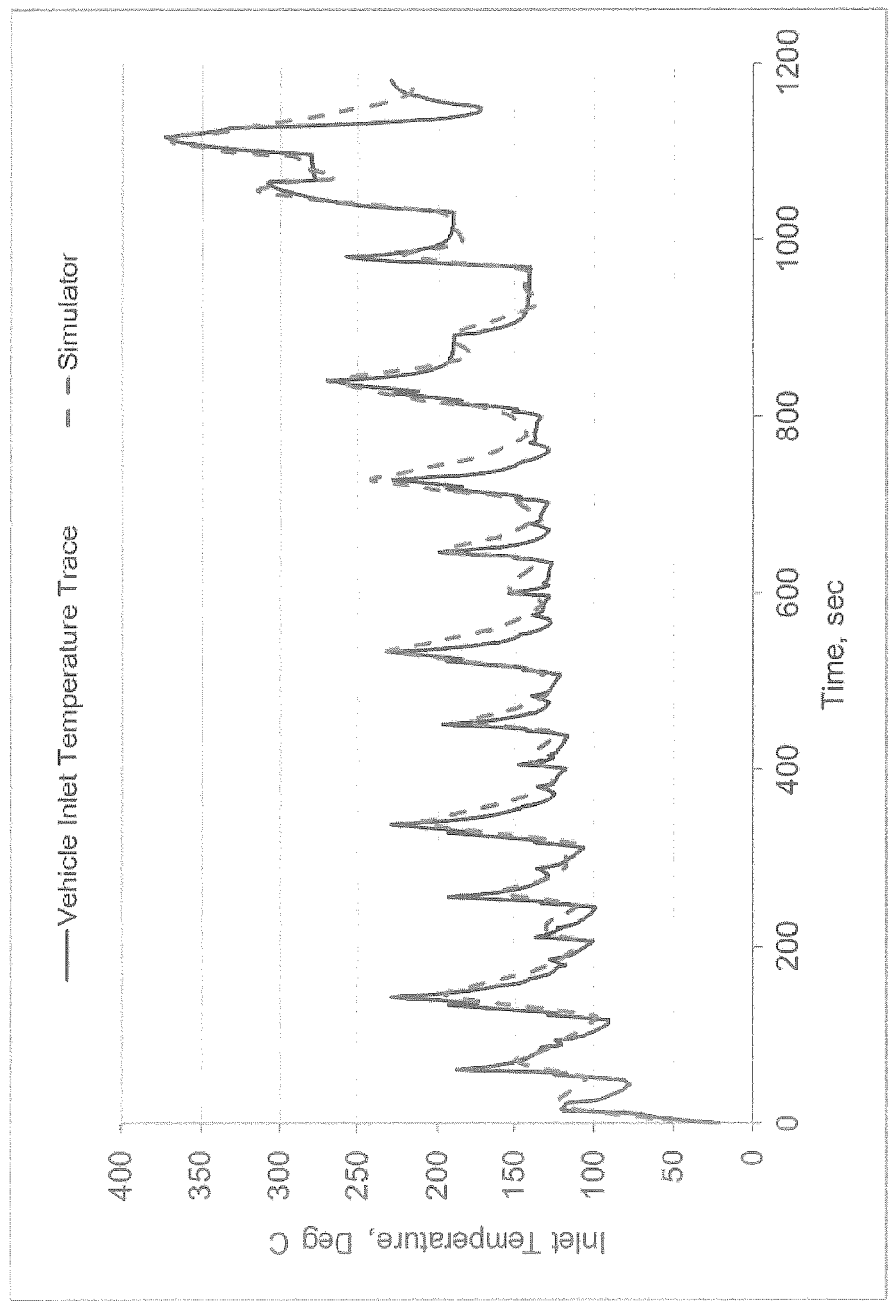
Fig. 5 Comparison of engine out temperature traces between vehicle and simulator

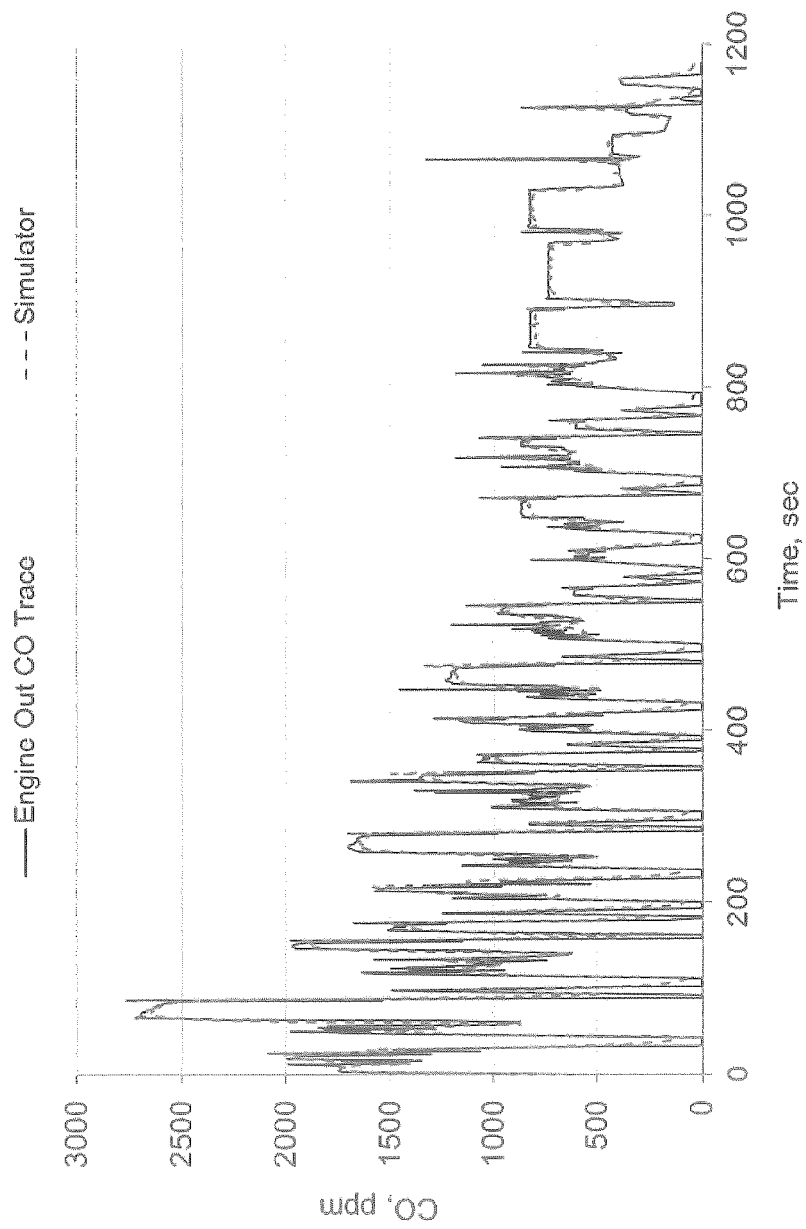
Fig. 6 Comparison of engine out CO emissions between the vehicle trace and the simulator setup

HYDROGEN-ASSISTED INTEGRATED EMISSION CONTROL SYSTEM

CROSS-REFERENCE TO RELATED APPLICATIONS

This application is a 35 U.S.C. § 371 application of International Application No. PCT/US2018/052305, filed Apr. 3, 2018, which International Application was published by the International Bureau in English on Oct. 11, 2018, and claims priority to U.S. Provisional Application No. 62/481,406, filed Apr. 4, 2017, which are incorporated herein by reference in their entirety and for all purposes.

FIELD OF THE INVENTION

The invention relates generally to the field of selective catalytic reduction catalysts and oxidation catalysts, as well as emission control systems employing such catalysts.

BACKGROUND OF THE INVENTION

Environmental regulations for emissions of internal combustion engines are becoming increasingly stringent throughout the world. Operations of lean burn engines, for example diesel engines, provide the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a platinum group metal (PGM) dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain PGM promote the oxidation of NO to $NO_2$. Catalysts are typically defined by their light-off temperature or the temperature at which 50% conversion is attained, also called $T_{50}$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include a sorbent material, which may be a zeolite, as part of a catalytic treatment system in order to adsorb and/or absorb gaseous pollutants, usually hydrocarbons, and retain them during the initial cold-start period. As the exhaust gas temperature increases, the stored hydrocarbons are driven from the sorbent and subjected to catalytic treatment at the higher temperature.

One effective method to reduce $NO_x$ from the exhaust of lean burn engines, such as gasoline direct injection and partial lean burn engines, as well as from diesel engines, requires trapping and storing of $NO_x$ under lean burn engine operating conditions and reducing the trapped $NO_x$ under stoichiometric or rich engine operating conditions or under lean engine operation with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, the short and frequent regeneration is favored over long but less frequent regeneration. Thus, a lean $NO_x$ trap catalyst generally must provide a $NO_x$ trapping function and a three-way conversion function.

Some lean $NO_x$ trap (LNT) systems contain alkaline earth elements. For example, $NO_x$ sorbent components include alkaline earth metal oxides, such as oxides of Mg, Ca, Sr or Ba. Other LNT systems can contain rare earth metal oxides such as oxides of Ce, La, Pr or Nd. The $NO_x$ sorbents can be used in combination with platinum group metal catalysts, such as platinum dispersed on an alumina support, for catalytic $NO_x$ oxidation and reduction. The LNT catalyst operates under cyclic lean (trapping mode) and rich (regeneration mode) exhaust conditions during which the engine out NO is converted to $N_2$.

Another effective method to reduce $NO_x$ from the exhaust of lean-burn engines requires reaction of $NO_x$ under lean burn engine operating conditions with a suitable reductant such as ammonia or hydrocarbon in the presence of a selective catalytic reduction (SCR) catalyst. Suitable SCR catalysts include metal-containing molecular sieves such as metal-containing zeolites. A useful SCR catalyst component is able to effectively catalyze the reduction of the $NO_x$ exhaust component at temperatures below 600° C., so that reduced $NO_x$ levels can be achieved even under conditions of low load which typically are associated with lower exhaust temperatures.

Increasingly stringent emissions regulations have driven the need for developing emission gas treatment systems with improved CO, HC and NO oxidation capacity to manage CO, HC and NO emissions at low engine exhaust temperatures. In addition, development of emission gas treatment systems for the reduction of $NO_x$ (NO and $NO_2$) emissions to nitrogen has become increasingly important, resulting in a more complicated system to handle every aspect of the driving cycles. One example is a diesel exhaust treatment system having a DOC+CSF+SCR+AMOx system wherein the DOC (diesel oxidation catalyst) will reduce CO/HC emissions and the CSF (catalyzed soot filter) will minimize particulates and further reduce the entrainment of CO/HC. The SCR (selective catalytic reduction article) will reduce $NO_x$ emissions with injections of ammonia or an ammonia precursor. However, an AMOx (ammonia oxidation) catalyst article is needed to minimize the slip of ammonia during the SCR operation.

A CSF is an article generally comprising an oxidation catalyst deposited onto a soot filter. The soot filter may be made of any suitable refractory material, e.g., cordierite, cordierite-α alumina, silicon nitride, silicon carbide, aluminum titanite, aluminum carbide, zirconium mullite, spodumene, alumina-silica magnesia, zirconium silicate, sillimanite, magnesium silicates, zirconia, petalite, α-alumina, aluminosilicates and the like, or a combination of any two or more thereof. It may be made of metal, such as aluminum, iron, stainless steel, carbon steel, and the like. The wall-flow filter is defined as a flow-through substrate in which the exhaust gas in different parts of the substrate may communicate through the walls of the passages. One example may be, but not limit to, an Emitec LS/PE substrate.

Exhaust gas treatment systems requiring four or five different catalyst/functional articles, such as described above, are useful in certain configurations to achieve the required abatement of CO, HC, $NO_x$ and PM. However, such systems are expensive and complex, increase back pressure resistance in the exhaust system, and require a significant amount of space in the vehicle to implement. Accordingly, there is a need in the art for a simplified exhaust gas treatment system requiring fewer catalytic/functional articles.

SUMMARY OF THE INVENTION

The invention provides an emission control system for treatment of an exhaust gas stream (such as produced by an engine), comprising an oxidation catalyst composition disposed on a substrate downstream from the exhaust gas source (e.g., an engine) and in fluid communication with the exhaust gas stream; and at least one selective catalytic reduction (SCR) component downstream from the oxidation catalyst, such as a monolithic wall-flow filter article comprising a front upstream end and a rear downstream end defining an axial length, wherein the monolithic wall-flow filter article has a selective catalytic reduction (SCR) coating composition disposed thereon, the SCR coating composition comprising a first SCR catalyst and a second SCR catalyst, wherein the second SCR catalyst comprises a base metal-containing (e.g., copper and/or iron) molecular sieve. In alternative embodiments, the at least one SCR component comprises an SCR catalyst composition disposed on a flow-through monolith.

The emission control system of the invention is particularly useful in conjunction with a hydrogen injection article configured to introduce hydrogen upstream of the oxidation catalyst composition or downstream from the oxidation catalyst composition and upstream of the SCR component. In some embodiments, the system is configured for intermittent introduction of stored hydrogen, such as systems configured to introduce stored hydrogen during a cold-start period. The system may further include a hydrogen storage article.

In certain embodiments, the first SCR catalyst is effective at a temperature of <250° C.; and the second SCR catalyst is effective at a temperature of from about 250° C. to about 550° C. For example, the first SCR catalyst can comprise a PGM component (e.g., rhodium) dispersed on a refractory metal oxide support, such as a PGM component from about 5 $g/ft^3$ to about 250 $g/ft^3$, based on the volume of the monolithic wall-flow filter article or the flow-through monolith article.

Exemplary molecular sieves include 8-ring small pore molecular sieves. In one embodiment, the molecular sieve is a zeolite having a structure selected from the group consisting of AEI, AFT, AFX, CHA, EAB, ERI, KFI, LEV, SAS, SAT and SAV. In one particular embodiment, the molecular sieve is an aluminosilicate zeolite having a CHA crystal structure and a silica-to-alumina ratio (SAR) of from about 1 to about 1000. The base metal is typically present in the molecular sieve from about 0.1 to about 10 wt. %, based on the total weight of the base metal-containing molecular sieve.

The two SCR catalyst compositions can be in separate layers on the wall-flow substrate. For example, a first SCR coating layer comprising the first SCR catalyst and a second SCR coating layer comprising the base metal-containing molecular sieve can be zone coated, wherein the first SCR coating layer is proximal to the front upstream end and the second SCR coating layer is proximal to the rear downstream end.

The substrate having the oxidation catalyst composition disposed thereon and the monolithic wall-flow filter article can each comprise, for example, a material independently selected from cordierite, aluminum titanate, silicon carbide, silicon titanate, composite, metal or metal foam.

The monolithic wall-flow filter article can have various porosity characteristics, such as a porosity in the range of from about 50% to about 85%, and/or pores having an average pore size of from about 5 microns to about 100 microns.

An exemplary oxidation catalyst composition comprises a platinum group metal (PGM) component dispersed on a refractory metal oxide support, such as an oxidation catalyst composition comprising a PGM component in the range of about 5 $g/ft^3$ to about 250 $g/ft^3$, based on the volume of the substrate.

In certain embodiments, the system consists only of the oxidation catalyst composition disposed on a substrate and the monolithic wall-flow filter article with no further emission treatment units within the emission control system.

In another aspect, the invention provides a method of treating an exhaust gas stream (e.g., an exhaust gas produced by an engine), comprising: receiving the exhaust gas stream into an emission control system comprising an oxidation catalyst composition disposed on a substrate in fluid communication with the exhaust gas stream and a monolithic wall-flow filter article downstream from the oxidation catalyst and comprising a front upstream end and a rear downstream end defining an axial length, and wherein the monolithic wall-flow filter article has a selective catalytic reduction (SCR) coating composition disposed thereon, the SCR coating composition comprising a first SCR catalyst and a second SCR catalyst, wherein the second SCR catalyst comprises a base metal-containing molecular sieve. The method can further include intermittently injecting hydrogen upstream of the oxidation catalyst composition, such as during a cold-start period.

The disclosure includes, without limitation, the following embodiments:

Embodiment 1: An emission control system for treatment of an exhaust gas stream, comprising: an oxidation catalyst composition disposed on a substrate in fluid communication with the exhaust gas stream; at least one selective catalytic reduction (SCR) composition disposed on a substrate downstream from the oxidation catalyst composition; and a hydrogen injection article configured to introduce hydrogen into the exhaust gas stream upstream of the oxidation catalyst composition or downstream of the oxidation catalyst composition and upstream of the at least one SCR composition.

Embodiment 2: The emission control system of any preceding embodiment, wherein the substrate supporting the at least one SCR composition is a flow-through monolith or a monolithic wall-flow filter.

Embodiment 3: The emission control system of any preceding embodiment, wherein the at least one SCR composition is selected from the group consisting of a base metal-containing molecular sieve, a platinum group metal component dispersed on a refractory metal oxide support, and combinations thereof.

Embodiment 4: The emission control system of any preceding embodiment, wherein the at least one SCR composition comprises a first SCR catalyst comprising a platinum group metal component dispersed on a refractory metal oxide support and a second SCR catalyst comprising a base metal-containing molecular sieve.

Embodiment 5: The emission control system of any preceding embodiment, wherein the first SCR catalyst comprises rhodium.

Embodiment 6: The emission control system of any preceding embodiment, wherein the base metal comprises copper and/or iron.

Embodiment 7: The emission control system of any preceding embodiment, wherein the molecular sieve is an 8-ring small pore molecular sieve.

Embodiment 8: The emission control system of any preceding embodiment, wherein the molecular sieve is a zeolite having a structure selected from the group consisting of AEI, AFT, AFX, CHA, EAB, ERI, KFI, LEV, SAS, SAT and SAV.

Embodiment 9: The emission control system of any preceding embodiment, wherein the molecular sieve is an aluminosilicate zeolite having a CHA crystal structure and a silica-to-alumina ratio of from about 1 to about 1000.

Embodiment 10: The emission control system of any preceding embodiment, wherein the base metal is present in the molecular sieve from about 0.1 wt. % to about 10 wt. %, based on the total weight of the base metal-containing molecular sieve.

Embodiment 11: The emission control system of any preceding embodiment, wherein the first SCR catalyst comprises a platinum group metal component from about 5 g/ft$^3$ to about 250 g/ft$^3$, based on the volume of the substrate supporting the SCR catalyst composition.

Embodiment 12: The emission control system of any preceding embodiment, wherein the first SCR catalyst further comprises an ammonia adsorption component.

Embodiment 13: The emission control system of any preceding embodiment, wherein the ammonia adsorption component is a zeolite selected from the group consisting of clinoptilolite, mordenite, and beta zeolite.

Embodiment 14: The emission control system of any preceding embodiment, wherein the system consists only of the oxidation catalyst composition disposed on a substrate and the at least one selective catalytic reduction (SCR) composition disposed on a substrate with no further emission treatment units within the emission control system.

Embodiment 15: The emission control system of any preceding embodiment, wherein the oxidation catalyst composition comprises a platinum group metal component dispersed on a refractory metal oxide support.

Embodiment 16: The emission control system of any preceding embodiment, wherein the oxidation catalyst composition comprises a platinum group metal component in the range of about 5 g/ft$^3$ to about 250 g/ft$^3$, based on the volume of the substrate.

Embodiment 17: The emission control system of any preceding embodiment, wherein the system is configured for intermittent introduction of stored hydrogen.

Embodiment 18: The emission control system of any preceding embodiment, wherein the system is configured to introduce stored hydrogen during a cold-start period.

Embodiment 19: The emission control system of any preceding embodiment, further comprising a hydrogen storage article.

Embodiment 20: The emission control system of any preceding embodiment, wherein the substrate supporting the at least one SCR catalyst composition is a monolithic wall-flow filter article comprising a front upstream end and a rear downstream end defining an axial length, wherein the least one SCR catalyst composition comprises a first SCR catalyst comprising a platinum group metal component dispersed on a refractory metal oxide support and a second SCR catalyst comprising a base metal-containing molecular sieve.

Embodiment 21: The emission control system of any preceding embodiment, wherein the at least one SCR catalyst composition comprises a first SCR coating layer comprising the first SCR catalyst and a second SCR coating layer comprising the second SCR catalyst.

Embodiment 22: The emission control system of any preceding embodiment, wherein the first SCR coating layer and the second SCR coating layer are zone coated, wherein the first SCR coating layer is proximal to the front upstream end and the second SCR coating layer is proximal to the rear downstream end.

Embodiment 23: The emission control system of any preceding embodiment, wherein the monolithic wall-flow filter article has a porosity in the range of from about 50% to about 85%.

Embodiment 24: The emission control system of any preceding embodiment, wherein the monolithic wall-flow filter article comprises pores having an average pore size of from about 5 microns to about 100 microns.

Embodiment 25: The emission control system of any preceding embodiment, further comprising an injector upstream of and in fluid communication with the at least one selective catalytic reduction (SCR) composition and configured to introduce ammonia or an ammonia precursor upstream of the at least one selective catalytic reduction (SCR) composition.

Embodiment 26: A method of treating an exhaust gas stream, the method comprising: receiving the exhaust gas stream into an oxidation catalyst article comprising an oxidation catalyst composition disposed on a substrate in fluid communication with the exhaust gas stream to produce a first effluent; receiving the first effluent into a selective catalytic reduction (SCR) article comprising at least one SCR composition disposed on a substrate downstream from the oxidation catalyst article; and intermittently injecting hydrogen upstream of the oxidation catalyst article or downstream of the oxidation catalyst article and upstream of the SCR article.

Embodiment 27: The method of any preceding embodiment, wherein said intermittently injecting hydrogen comprising injecting hydrogen during a cold-start period.

Embodiment 28: The method of any preceding embodiment, wherein the substrate supporting the at least one SCR composition is a flow-through monolith or a monolithic wall-flow filter.

Embodiment 29: The method of any preceding embodiment, wherein the at least one SCR composition is selected from the group consisting of a base metal-containing molecular sieve, a platinum group metal component dispersed on a refractory metal oxide support, and combinations thereof.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosure, in any of its various aspects and embodiments, should be viewed as intended to be combinable unless the context clearly dictates otherwise.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 1a shows a perspective view of a wall-flow filter substrate.

FIG. 1b shows a cross-sectional view of a section of a wall-flow filter substrate.

FIG. 3 shows an exhaust treatment system downstream of and in fluid communication with an internal combustion engine.

FIG. 5 shows a comparison of engine out temperature traces between vehicle and simulator.

FIG. 6 shows a comparison of engine out CO emissions between the vehicle trace and simulator.

DETAILED DESCRIPTION OF THE PREFERRED EMBODIMENTS

Figure 2A:
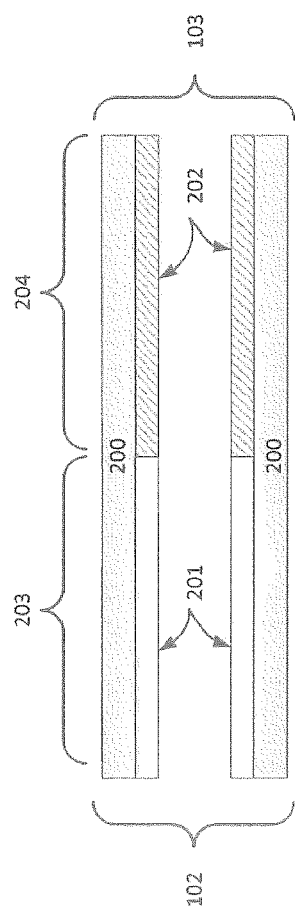
FIGS. 2a, 2b and 2c show some various coating configurations.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present articles, systems and methods are suitable for treatment of exhaust gas streams from mobile emissions sources such as trucks and automobiles. The articles, systems and methods are also suitable for treatment of exhaust streams from stationary sources such as power plants.

In the present exhaust gas treatment methods, the exhaust gas stream is passed through the article or treatment system by entering the upstream end and exiting the downstream end. The inlet end of a substrate is synonymous with the "upstream" end or "front" end. The outlet end is synonymous with the "downstream" end or "rear" end. A substrate will have a length and a diameter.

The term "vehicle" means for instance any vehicle having an internal combustion engine, for instance a passenger automobile, sport utility vehicle, minivan, van, truck, bus, refuse vehicle, freight truck, construction vehicle, heavy equipment, military vehicle or tractor.

In general, the term "effective" means, for example, from about 35% to 100% effective, for instance from about 40% effective, about 45% effective, about 50% effective or about 55% effective to about 60% effective, about 65% effective, about 70% effective, about 75% effective, about 80% effective, about 85% effective, about 90% effective or about 95% effective, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

The term "substrate" refers to the monolithic material onto which a catalyst composition, typically a catalytic coating, is disposed. The substrates are typically flow-through monoliths or monolithic wall-flow filters.

The term "catalyst" refers to a material that promotes a chemical reaction. The catalyst includes the "catalytically active species" and the "carrier" that carries or supports the active species. For example, molecular sieves including zeolites are carriers/supports for copper active catalytic species. Likewise, refractory metal oxide particles may be a carrier for platinum group metal catalytic species.

The term "sorbent" refers to a material that adsorbs and/or absorbs a desired substance, in this invention $NO_x$ and/or CO and/or HC and/or $NH_3$. Sorbents may advantageously adsorb and/or absorb (store) a substance at a certain temperature and desorb (release) the substance at a higher temperature.

The term "functional article" in the invention means an article comprising a substrate having a functional coating composition disposed thereon, in particular a catalyst and/or sorbent coating composition.

The catalytically active species are also termed "promoters" as they promote chemical reactions. For instance, the present copper-containing molecular sieves may be termed copper-promoted molecular sieves. A "promoted molecular sieve" refers to a molecular sieve to which catalytically active species are intentionally added.

"Platinum group metal components" refer to platinum group metals or one of their oxides. "Rare earth metal components" refer to one or more oxides of the lanthanum series defined in the Periodic Table of Elements, including lanthanum, cerium, praseodymium and neodymium.

Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

Unless otherwise indicated, all parts and percentages are by weight. Weight percent (wt. %), if not otherwise indicated, is based on an entire composition free of any volatiles, that is, based on dry solids content.

All U.S. patent applications, published patent applications and patents referred to herein are hereby incorporated by reference in their entirety.

The present invention provides an emission treatment system, and a related method of treating exhaust gas, that includes both an oxidation catalyst downstream from an exhaust gas source, such as an engine, and in fluid communication with an exhaust gas stream, and a selective catalytic reduction (SCR) catalyst downstream from the oxidation catalyst. The emission treatment system advantageously includes no further emission control units (i.e., functional articles or units) and, thus, provides reduced complexity, cost, and size compared to many conventional emission control systems. In certain advantageous embodiments, the emission control system performance is improved by hydrogen injection upstream of the oxidation catalyst, or downstream from the oxidation catalyst and upstream of the SCR catalyst, as explained more fully herein.

The SCR catalyst (typically in the form of an SCR catalyst coated on a flow-through monolith or wall-flow filter) and the oxidation catalyst (typically in the form of an oxidation catalyst coated on a flow-through monolith) are each functional articles and together comprise an exhaust gas treatment system. The treatment system is in general downstream of and in fluid communication with an internal combustion engine or other exhaust gas source. The SCR catalyst is downstream of and in fluid communication with the oxidation catalyst. A treatment system 303 suitable for use in the present invention is shown in FIG. 3, comprising an oxidation catalyst unit 301 and an SCR catalyst unit 302 downstream of and in fluid communication with an internal combustion engine 300. The inlet and outlet ends of the oxidation catalyst unit 301 and the SCR catalyst unit 302 are labeled. Advantageously, as noted above, the present treatment system contains only two functional articles; that is, the SCR catalyst (optionally including two SCR catalyst compositions) and the oxidation catalyst.

Each of the oxidation catalyst unit and the SCR catalyst unit are examples of functional articles, which contain a substrate having a functional coating composition disposed thereon. Functional coating compositions contain sorbent and/or catalyst compositions. In general, the substrates are ceramic or metal having a honeycomb structure.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

The present substrates may also be metallic, comprising one or more metals or metal alloys. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel.

Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

The present substrates are three-dimensional having a length and a diameter and a volume, similar to a cylinder. The shape does not necessarily have to conform to a cylinder. The length is an axial length defined by an inlet end and an outlet end. The diameter is the largest cross-section length, for example, the largest cross-section if the shape does not conform exactly to a cylinder.

A catalyst and/or sorbent composition as described herein may comprise one or more supports or "carriers" such as refractory inorganic solid oxide porous powders further comprising functionally active species. A catalyst composition may typically be applied in the form of a washcoat containing supports having catalytically active species thereon. A sorbent composition may typically be applied in the form of a washcoat containing sorption active species. Catalyst and sorbent components may also be combined in a single washcoat. A washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied.

Catalyst and/or sorbent compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica.

Figure 4:
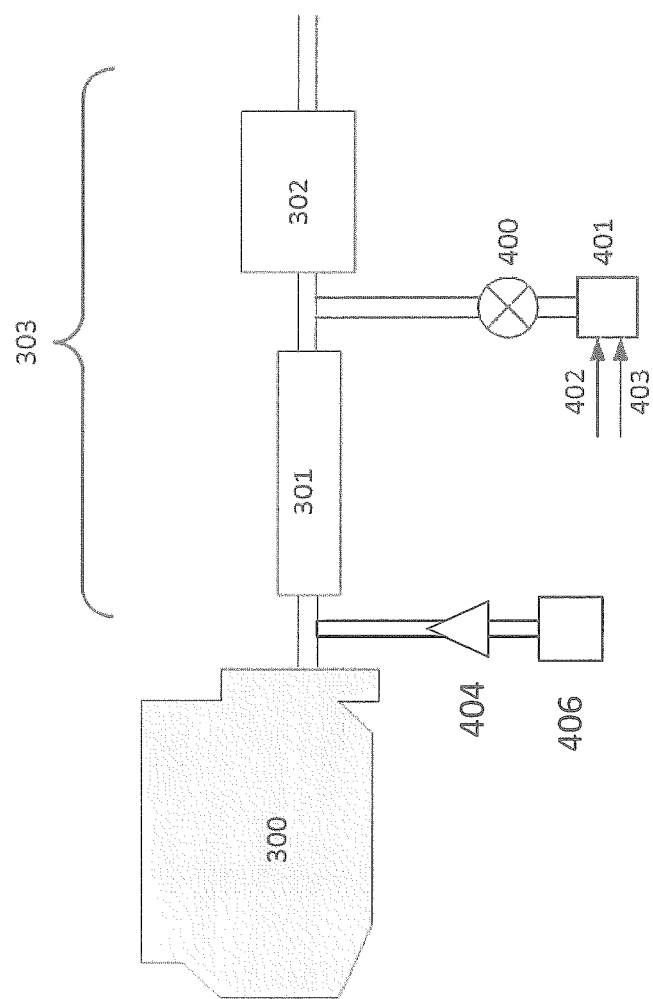
FIG. 4 shows an exhaust treatment system downstream of and in fluid communication with an internal combustion engine.

FIG. 4 shows a particularly advantageous exhaust treatment system embodiment 303 downstream of and in fluid communication with an internal combustion engine 300. The treatment system 303 comprises an oxidation catalyst unit (e.g., an oxidation catalyst composition on a flow-through honeycomb monolith) 301 and an SCR catalyst unit, optionally comprising two SCR catalyst compositions, on a flow-through monolith or wall-flow filter monolith 302. The treatment system of this embodiment 303 optionally further includes a valve 400 and a mixing box 401. Aqueous urea (or other suitable reductant such as ammonia or other ammonia precursors) is mixed with air in the mixing box 401 and each are directed to the mixing box via lines 402 and 403, respectively. Valve 400 is suitable to meter precise amounts of aqueous urea to the exhaust stream. Urea is converted to ammonia which serves as the reductant in the SCR catalyst unit 302. Other articles not shown may include reservoirs, pumps, spray nozzles, etc.

As noted above, the present treatment system may also contain an article suitable to introduce ammonia upstream of the SCR catalyst unit 302, such as by using all or a portion of the urea injection system noted above. A urea or an ammonia injection article will be in fluid communication with the treatment system and may comprise, reservoirs, pumps, spray nozzles, valves, mixing boxes, etc.

The exhaust gas treatment system may comprise a hydrogen injection article 404 as shown in FIG. 4, configured to introduce hydrogen upstream of the oxidation catalyst unit or, alternatively, downstream of the oxidation catalyst unit and upstream of the SCR catalyst (not shown). For example, the hydrogen injection article can be configured for intermittent introduction of stored hydrogen. The system may be configured, for example, to introduce stored hydrogen during a cold-start period. Hydrogen may be brought on-board in a hydrogen storage article (e.g., hydrogen storage article 406 in FIG. 4), or may be generated on-board from water-splitting or from ammonia decomposition. In some embodiments, the hydrogen injection article comprises a check valve.

Hydrogen may, for example, be stored in a gas storage tank or reservoir. Hydrogen may be stored for instance in a solid state, for example in silicon or a hydrogen storage alloy. Solid state hydrogen storage is taught, for example, in U.S. Pre-Grant Publication Nos. 2004/0241507, 2008/0003470, 2008/0274873, 2010/0024542 and 2011/0236790, which are incorporated by reference herein in their entirety. Hydrogen storage alloys reversibly store hydrogen and are disclosed for example in U.S. Pat. Nos. 5,407,761 and 6,193,929 and U.S. Pre-Grant Publication No. 2016/0230255, which are incorporated by reference herein in their entirety. Hydrogen storage alloys are, for example, modified $AB_x$ type metal hydride (MH) alloys where in general, A is a hydride forming element and B is a weak or non-hydride forming element. A is in general a larger metallic atom with 4 or less valence electrons and B is in general a smaller metallic atom with 5 or more valence electrons. Suitable $AB_x$ alloys include those where x is from about 0.5 to about 5. The present alloys are capable of reversibly absorbing (charging) and desorbing (discharging) hydrogen. $AB_x$ type alloys are for example of the categories (with simple examples), AB (HfNi, TiFe, TiNi), $AB_2$ ($ZrMn_2$, $TiFe_2$), $A_2B$ ($Hf_2Fe$, $Mg_2Ni$), $AB_3$ ($NdCo_3$, $GdFe_3$), $A_2B_7$ ($Pr_2Ni_7$, $Ce_2Co_7$) and $AB_5$ ($LaNi_5$, $CeNi_5$).

Hydrogen may advantageously be injected into an exhaust gas stream of an internal combustion engine where it will suitably function as a reductant in certain catalytic processes and/or catalyst regeneration processes. Catalytic processes include oxidation of CO and/or HC and/or $NO_x$ pollutants. Although not bound by any particular theory of operation, it is believed that injection of hydrogen (e.g., upstream of the exhaust gas treatment system) can boost performance of the treatment system such that fewer components may be required to meet government emission regulations, particularly with respect to $NO_x$ and/or CO and/or HC emissions.

Another subject of the present invention is a method for treating an exhaust gas stream containing $NO_x$ and/or CO and/or HC and/or soot, comprising receiving the exhaust stream into the present exhaust gas treatment system. In the method, the exhaust gas stream is received into the article or system from the upstream end and exits the downstream end. By using hydrogen injection to boost performance in preferred embodiments, the two-component system suggested herein (i.e., upstream oxidation catalyst unit and downstream SCR catalyst unit) can provide sufficient emission control performance without the complexity, size, and cost associated with many conventional systems. In particular, hydrogen injection during cold-start periods is believed to boost performance of the overall emission treatment system.

The method of controlling hydrogen injection can vary. In certain embodiments, an onboard controller may simply inject hydrogen during a defined time period at engine start-up, such as the first 200 seconds or the first 300 seconds (i.e., a cold-start period). Alternatively, the controller will receive certain data from the treatment system that is used to determine the timing of hydrogen injection. For example, one control system embodiment can receive oxidation catalyst unit inlet and outlet temperature data and control hydrogen injection based on the temperature data. In one embodiment, hydrogen injection will occur when the oxidation catalyst unit inlet temperature is less than about 75° C., such as about 50° C. to about 70° C., and hydrogen injection will stop when the oxidation catalyst unit outlet temperature is above about 100° C., such as about 100° C. to about 120° C.

Advantages of the invention include fewer components and lower cost than conventional systems, a lower space requirement for the integrated system, and good backpressure performance.

Pressure drop is measured for instance by measuring pressure as a function of air flow, using commercially available equipment such as a SUPERFLOW SF 1020 PROBENCH. Pressure drop may for example be measured at an air flow at any point of from 100 cubic feet per minute (cfm) to 375 cfm, for instance at 125, 150, 175, 200, 225, 250, 275, 300, 325 or 350 cfm. Pressure drop may be measured at standard room temperature, ca. 25° C.

Oxidation Catalyst Composition

The oxidation catalyst is suitable to oxidize $NO_x$ and/or CO and/or HC components of exhaust gas, for example at a relatively low temperature of <250° C. Suitable oxidation catalysts advantageously comprise a platinum group metal (PGM) dispersed on a refractory metal oxide support.

The support material on which the catalytically active PGM is deposited for example comprises a refractory metal oxide, which exhibits chemical and physical stability at high temperatures, such as the temperatures associated with gasoline or diesel engine exhaust. Exemplary metal oxides include alumina, silica, zirconia, titania, ceria, praseodymia, tin oxide and the like, as well as physical mixtures or chemical combinations thereof, including atomically-doped combinations and including high surface area or activated compounds such as activated alumina.

Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 to about 300 $m^2/g$. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of about 60 to about 350 $m^2/g$, for example from about 90 to about 250 $m^2/g$.

In certain embodiments, metal oxide supports useful in the catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$) or doped zirconia materials, such as Si-doped $ZrO_2$ (including, but not limited to 5-30% $SiO_2$—$ZrO_2$).

Advantageously, a refractory metal oxide may be doped with one or more additional basic metal oxide materials such as lanthanum oxide, barium oxide, strontium oxide, calcium oxide, magnesium oxide or combinations thereof. The metal oxide dopant is typically present in an amount of about 1 to about 20% by weight, based on the weight of the catalyst composition. The dopant oxide materials may serve to improve the high temperature stability of the refractory metal oxide support or function as a sorbent for acidic gases such as $NO_2$, $SO_2$ or $SO_3$.

The dopant metal oxides can be introduced using an incipient wetness impregnation technique or by addition of colloidal mixed oxide particles. Doped metal oxides include baria-alumina, baria-zirconia, baria-titania, baria-zirconia-alumina, lanthana-zirconia and the like.

Thus, the refractory metal oxides or refractory mixed metal oxides in the catalyst compositions are typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. Further doping with basic metal oxides provides additional useful refractory oxide supports including but not limited to baria-alumina, baria-zirconia, baria-titania, baria-zirconia-alumina, lanthana-zirconia and the like.

The oxidation catalyst composition may comprise any of the above-named refractory metal oxides and in any amount. For example refractory metal oxides in the catalyst composition may comprise at least about 15, at least about 20, at least about 25, at least about 30 or at least about 35 wt. % (weight percent) alumina where the wt. % is based on the total dry weight of the catalyst composition. The catalyst composition may for example comprise from about 10 to about 99 wt. % alumina, from about 15 to about 95 wt. % alumina or from about 20 to about 85 wt. % alumina.

The oxidation catalyst composition comprises for example from about 15 wt. %, about 20 wt. %, about 25 wt. %, about 30 wt. % or about 35 wt. % to about 50 wt. %, about 55 wt. %, about 60 wt. % about 65 wt. % or about 70 wt. % alumina based on the weight of the catalytic composition.

Advantageously, the oxidation catalyst composition may comprise ceria, alumina and zirconia or doped compositions thereof.

The oxidation catalyst composition coated onto a substrate may comprise a PGM component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry composition.

The PGM component of the oxidation catalyst composition is, for example, present from about 5 $g/ft^3$, 10 $g/ft^3$, about 15 $g/ft^3$, about 20 $g/ft^3$, about 40 $g/ft^3$ or about 50 $g/ft^3$ to about 70 $g/ft^3$, about 90 $g/ft^3$, about 100 $g/ft^3$, about 120 $g/ft^3$, about 130 $g/ft^3$, about 140 $g/ft^3$, about 150 $g/ft^3$, about 160 $g/ft^3$, about 170 $g/ft^3$, about 180 $g/ft^3$, about 190 $g/ft^3$, about 200 $g/ft^3$, about 210 $g/ft^3$, about 220 $g/ft^3$, about 230 $g/ft^3$, about 240 $g/ft^3$ or about 250 $g/ft^3$, based on the volume of the substrate.

The oxidation catalyst composition in addition to the refractory metal oxide support and catalytically active metal may further comprise any one or combinations of the oxides of lanthanum, barium, praseodymium, neodymium, samarium, strontium, calcium, magnesium, niobium, hafnium, gadolinium, terbium, dysprosium, erbium, ytterbium, manganese, iron, chromium, tin, zinc, nickel, cobalt or copper.

Optionally, the oxidation catalyst unit can further include, either as a separate composition layer or as part of a homogenous mixture with the oxidation catalyst composition, an ammonia sorbent composition effective to adsorb and/or absorb ammonia and release the stored ammonia under certain conditions. Released ammonia may be employed in downstream SCR reactions. For instance, stored ammonia may be released during acceleration of the engine.

The ammonia sorbent may comprise a molecular sieve, such as any of the molecular sieves described herein. Advantageously, the ammonia sorbent comprises small pore or medium pore molecular sieves.

Optionally, the oxidation catalyst unit can further include, either as a separate composition layer or as part of a homogenous mixture with the oxidation catalyst composition, a second sorbent composition suitable to adsorb and/or absorb $NO_x$ and/or CO and/or HC components of exhaust gas. The second sorbent is advantageously different from the ammonia sorbent composition. Suitable sorbents include but are not limited to materials such as alkaline earth metal oxides, alkaline earth metal carbonates, rare earth oxides and molecular sieves. Included are oxides or carbonates of Mg, Ca, Sr or Ba and/or oxides of Ce, La, Pr or Nd. Sorbent molecular sieves include zeolites.

Advantageously, the second sorbent comprises a molecular sieve. The present molecular sieves comprise small pore, medium pore and large pore molecular sieves or combinations thereof. A small pore molecular sieve contains channels defined by up to eight tetrahedral atoms. A medium pore molecular sieve contains channels defined by ten-membered rings. A large pore molecular sieve contains channels defined by twelve-membered rings. In some embodiments, these molecular sieves are selected from $H^+$-forms of large pore molecular sieves such as Beta zeolite or clinoptilolite. Also suitable are base metal-containing molecular sieves including FeBeta and CuCHA. Other large pore molecular sieves are those listed above and also ZSM-12, SAPO-37, etc.

Small pore molecular sieves are selected from the group consisting aluminosilicate molecular sieves, metal-containing aluminosilicate molecular sieves, aluminophosphate (AlPO) molecular sieves, metal-containing aluminophosphate (MeAlPO) molecular sieves, silico-aluminophosphate (SAPO) molecular sieves, and metal-containing silico-aluminophosphate (MeSAPO) molecular sieves and mixtures thereof. For example, small pore molecular sieves are selected from the group consisting of framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof. For instance, the small pore molecular sieve is selected from the group of framework types CHA, LEV, AEI, AFX, ERI, SFW, KFI, DDR and ITE.

Medium pore molecular sieves are selected from the group consisting of framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof. For instance, the medium pore molecular sieves are selected from the group consisting of framework types FER, MEL, MFI and STT.

Large pore molecular sieves are selected from the group consisting of framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof. For instance, the large pore molecular sieves are selected from the group consisting of framework types AFI, BEA, MAZ, MOR and OFF.

For example, molecular sieves may comprise a framework type selected from the group consisting of AEI, BEA (Beta zeolites), CHA (chabazite), FAU (zeolite Y), FER (ferrierite), MFI (ZSM-5) and MOR (mordenite). Non-limiting examples of zeolites having these structures include chabazite, faujasite, zeolite Y, ultrastable zeolite Y, Beta zeolite, mordenite, silicalite, zeolite X, and ZSM-5.

Useful molecular sieves have 8-ring pore openings and double-six ring secondary building units, for example, those having structure types AEI, AFT, AFX, CHA, EAB, ERI, KFI, LEV, SAS, SAT or SAV. Included are any and all isotopic framework materials such as SAPO, AlPO and MeAlPO materials having the same structure type.

The 8-ring small pore molecular sieves include aluminosilicates, borosilicates, gallosilicates, MeAPSOs and MeAlPOs. These include for example SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44 and CuSAPO-47. In some embodiments, the 8-ring small pore molecular sieve will have an aluminosilicate composition, such as SSZ-13 and SSZ-62.

In one or more embodiments, the 8-ring small pore molecular sieve has the CHA crystal structure and is selected from the group consisting of aluminosilicate zeolite having the CHA crystal structure, SAPO, AlPO and MeAlPO. For example, the 8-ring small pore molecular sieve having the CHA crystal structure is an aluminosilicate zeolite having the CHA crystal structure. In one embodiment, the 8-ring small pore molecular sieve having the CHA crystal structure will have an aluminosilicate composition, such as SSZ-13 and SSZ-62.

Molecular sieves can be zeolitic (zeolites) or may be non-zeolitic. Both zeolitic and non-zeolitic molecular sieves can have the chabazite crystal structure, which is also referred to as the CHA structure by the International Zeolite Association. Zeolitic chabazite includes a naturally occurring tectosilicate mineral of a zeolite group with approximate formula $(Ca,Na_2,K_2,Mg)Al_2Si_4O_{12} \cdot 6H_2O$ (i.e., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et. Al.; Zeolite D, described in British Patent No. 868,846 (1961); and Zeolite R, described in U.S. Pat. No. 3,030,181, which is incorporated by reference herein in its entirety. Synthesis of another synthetic form of zeolitic chabazite, SSZ-13, is described in U.S. Pat. No. 4,544,538, which is incorporated by reference herein in its entirety. Synthesis of a synthetic form of a non-zeolitic molecular sieve having the chabazite crystal structure, silicoaluminophosphate 34 (SAPO-34), is described in U.S. Pat. Nos. 4,440,871 and 7,264,789, which are incorporated by reference herein in their entirety. A method of making yet another synthetic non-zeolitic molecular sieve having chabazite structure, SAPO-44, is described for instance in U.S. Pat. No. 6,162,415, which is incorporated by reference herein in its entirety.

A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance from about 135° C. to about 170° C. Typical reaction times are between 1 hr and 30 days and in some embodiments, from 10 hours to 3 days. At the conclusion of the reaction, the pH is optionally adjusted to between 6 and 10, for example between 7 and 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C.

Molecular sieves having a CHA structure may be prepared for instance according to methods disclosed in U.S. Pat. Nos. 4,544,538 and 6,709,644, which are incorporated by reference herein in their entirety.

The molecular sieves may have a silica-to-alumina ratio (SAR) of from about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000.

For instance, present molecular sieves may have an SAR of from about 5 to about 250, from about 10 to about 200, from about 2 to about 300, from about 5 to about 250, from about 10 to about 200, from about 10 to about 100, from about 10 to about 75, from about 10 to about 60, from about 10 to about 50, from about 15 to about 100, from about 15 to about 75, from about 15 to about 60, from about 15 to about 50, from about 20 to about 100, from about 20 to about 75, from about 20 to about 60 or from about 20 to about 50.

The molecular sieves are, for instance, porous molecular sieve particles wherein greater than 90% of the molecular sieve particles have a particle size greater than 1 μm. In some embodiments, the molecular sieve particle size has a $d_{50}$ less than 80 microns. In one or more embodiments the molecular sieve particles have a $d_{50}$ less than 80, 70, 60, 55, 50, 45, 40, 35, 30, 25, 20, 15, or 10 microns. In some embodiments, the molecular sieve particle size has a $d_{50}$ less than 50 microns. In some embodiments, greater than 95% of the molecular sieve particles have a particle size greater than 1 µm and in more specific embodiments, greater than 96% of the molecular sieve particles have a particle size greater than 1 µm and in even more specific embodiments, the molecular sieve particle component comprises about 96% particles greater than 1 µm and about 85% of particles greater than 2 µm, and in highly specific embodiments, the molecular sieve particle component comprises about 96% particles within 5 µm of the mean particle size and the mean particle size is greater than about 5 µm. In one or more embodiments, the molecular sieve particle component comprises 96% particles in the range of about 1 µm to 10 µm. Molecular sieves suitable for adsorption are disclosed for example in U.S. Pre-Grant Publication No. 2016/0136626 and U.S. Pat. No. 9,321,042, which are incorporated by reference herein in their entirety.

The present molecular sieves may exhibit a high surface area, for example a BET surface area, determined according to DIN 66131, of at least about 400 m$^2$/g, at least about 550 m$^2$/g or at least about 650 m$^2$/g, for example from about 400 to about 750 m$^2$/g or from about 500 to about 750 m$^2$/g. The present molecular sieves may have a mean crystal size of from about 10 nanometers to about 10 microns, from about 50 nanometers to about 5 microns or from about 0.1 microns to about 0.5 microns as determined via SEM. For instance, the molecular sieve crystallites may have a crystal size greater than 0.1 microns or 1 micron and less than 5 microns.

The second sorbent is advantageously a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a Beta zeolite. Zeolite adsorbent materials may have a high silica-to-alumina ratio. The zeolites may have a silica-to-alumina molar ratio of from at least about 5:1, preferably at least about 50:1, with useful ranges of from about 5:1 to 1000:1, 50:1 to 500:1, as well as about 25:1 to 300:1. Suitable Zeolites include ZSM, Y and Beta zeolites. A HC adsorbent may comprise a Beta zeolite of the type disclosed in U.S. Pat. No. 6,171,556.

Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO and MeAlPO materials are considered non-zeolitic molecular sieves.

The functional coating may comprise one thin adherent layer disposed on and in adherence to the substrate. The coating layer may comprise the individual functional components, that is, the first sorbent composition, the oxidation catalyst composition and the ammonia sorbent composition.

In one embodiment, the oxidation catalyst composition is coated on a flow-through monolith substrate, which typically has fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. The flow-through monolith is ceramic or metallic as described above.

Flow-through monolith substrates for example have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

The functional coating that provides the oxidation catalyst composition may comprise more than one thin adherent layer, the layers in adherence to each other and the coating in adherence to the substrate. The entire coating comprises the individual "coating layers". The functional coating may advantageously be "zoned", comprising zoned functional layers. This may also be described as "laterally zoned". For example, a layer may extend from the inlet end towards the outlet end extending about 10%, about 20%, about 30%, about 40%, about 50%, about 60%, about 70%, about 80% or about 90% of the substrate length. Another layer may extend from the outlet end towards the inlet end extending about 10%, about 20%, about 30%, about 40%, about 50%, about 60%, about 70%, about 80% or about 90% of the substrate length. Different coating layers may be adjacent to each other and not overlay each other. Alternatively, different layers may overlay a portion of each other, providing a third "middle" zone. The middle zone may for example extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different functional compositions may reside in each separate coating layer. For example, one coating layer could comprise an oxidation catalyst composition without any optional sorbent compositions and a second layer could include (or consist entirely of) one or more optional sorbent compositions. Thus, discussion related to different layers may correspond to any of these layers. The coating composition may comprise 1, 2 or 3 or more coating layers. The one or more coating layers together comprise the 3 functional compositions. Any coating layer comprising a present functional composition is a "functional layer".

The present zones are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

Different coating layers may be in direct contact with the substrate. Alternatively, one or more "undercoats" may be present, so that at least a portion a functional coating layer or coating layers are not in direct contact with the substrate (but rather with the undercoat). One or more "overcoats" may also be present, so that at least a portion of the functional coating layer or layers are not directly exposed to a gaseous stream or atmosphere (but rather are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer."

An undercoat is a layer "under" a coating layer, an overcoat is a layer "over" a coating layer and an interlayer is a layer "between" two coating layers.

The interlayer(s), undercoat(s) and overcoat(s) may contain one or more functional compositions or may be free of functional compositions.

The present functional coatings may comprise more than one identical layers.

The oxidation catalyst unit is advantageously in a close-coupled position. A close-coupled position is for instance within about 12 inches (in) from where individual cylinder exhaust pipes join together (i.e., the exhaust manifold), for instance from about 0.5 in, about 1 in, about 2 in, about 3 in, about 4 in or about 5 in to about 6 in, about 7 in, about 8 in, about 9 in, about 10 in, about 11 in or about 12 in.

SCR Composition

The SCR composition used in the SCR article can comprise one or more SCR catalyst compositions as described herein. In certain embodiments, the SCR composition is, for example, effective to operate at two different temperature ranges, in particular at low temperatures of <250° C. and at high temperatures of from about 250° C. to about 550° C. For example, in certain embodiments, the SCR coating composition comprises a first SCR catalyst and a base metal-containing molecular sieve SCR catalyst. Selective catalytic reduction (SCR) catalysts convert $NO_x$ pollutants to nitrogen and water.

First SCR Catalyst Composition

Advantageously, the first SCR composition comprises one or more platinum group metals disposed on a high surface area, refractory metal oxide support, e.g., a high surface area alumina support. The PGM suitable in the SCR composition is for instance rhodium. The PGM-based SCR catalyst may advantageously be effective at temperatures of ≤250° C.

The first SCR catalyst may comprise a PGM component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry first catalyst.

The PGM component of the first catalyst is for example present from about 5 g/ft$^3$, 10 g/ft$^3$, about 15 g/ft$^3$, about 20 g/ft$^3$, about 40 g/ft$^3$ or about 50 g/ft$^3$ to about 70 g/ft$^3$, about 90 g/ft$^3$, about 100 g/ft$^3$, about 120 g/ft$^3$, about 130 g/ft$^3$, about 140 g/ft$^3$, about 150 g/ft$^3$, about 160 g/ft$^3$, about 170 g/ft$^3$, about 180 g/ft$^3$, about 190 g/ft$^3$, about 200 g/ft$^3$, about 210 g/ft$^3$, about 220 g/ft$^3$, about 230 g/ft$^3$, about 240 g/ft$^3$ or about 250 g/ft$^3$, based on the volume of the substrate.

The first SCR catalyst optionally further comprises an ammonia adsorption component capable of adsorbing and storing ammonia. Exemplary ammonia adsorption components include zeolites, such as clinoptilolite, mordenite, and beta zeolite.

Base Metal-Containing Molecular Sieve SCR Catalyst Composition

The SCR composition can also comprise a base metal-containing molecular sieve catalyst composition, effective at higher temperatures of from about 250° C. to about 550° C. This catalyst will in general employ injected urea as an ammonia precursor, where ammonia is the active reductant. In operation, urea is periodically metered into the exhaust stream from a position upstream of the SCR article. The injector is in fluid communication with and upstream of the SCR article. The injector will in general also be associated with a reductant (or reductant precursor) reservoir and a pump. Reservoirs, pumps and the like are not considered functional articles.

Suitable molecular sieves are as described herein in reference to the oxidation catalyst composition. Examples of molecular sieves have, for instance, 8-ring pore openings and double-six ring secondary building units, for example, those having the following structure types: AEI, AFT, AFX, CHA, EAB, ERI, KFI, LEV, SAS, SAT or SAV. Included are any and all isotopic framework materials such as SAPO, AlPO and MeAlPO materials having the same structure type. For instance, the present molecular sieves may each have an SAR of from about 5 to about 50, for instance from about 10 to about 30.

In one or more embodiments, the 8-ring small pore molecular sieve has the CHA crystal structure and is selected from the group consisting of aluminosilicate zeolites having the CHA crystal structure, SAPO, AlPO and MeAlPO. In particular, the 8-ring small pore molecular sieve having the CHA crystal structure is an aluminosilicate zeolite having the CHA crystal structure. In a specific embodiment, the 8-ring small pore molecular sieve having the CHA crystal structure will have an aluminosilicate composition, such as SSZ-13 and SSZ-62.

The base metal contained in the present base metal-containing molecular sieves catalyst composition is, for example, copper or iron or a mixture thereof. Copper- and iron-containing chabazite are termed CuCHA and FeCHA.

The copper or iron resides in the ion-exchange sites (pores) of the molecular sieves and may also be associated with the molecular sieves but not "in" the pores. For example, upon calcination, non-exchanged copper salt decomposes to CuO, also referred to herein as "free copper" or "soluble copper." The free copper may be advantageous as disclosed in U.S. Pat. No. 8,404,203, which is incorporated by reference herein in its entirety. The amount of free copper may be less than, equal to or greater than the amount of ion-exchanged copper.

The copper- or iron-containing molecular sieves are prepared for example via ion-exchange from for example a $Na^+$ containing molecular sieve ($Na^+$ form). The $Na^+$ form generally refers to the calcined form without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$ form is employed for ion-exchange with copper or iron. Optionally, the $NH_4^+$-exchanged molecular sieve is calcined to the $H^+$-form which may also be employed for ion-exchange with copper or iron cations.

Copper or iron is ion-exchanged into molecular sieves with alkali metal, $NH_4^+$ or $H^+$ forms with copper or iron salts such as copper acetate, copper sulfate, iron chloride, iron acetate, iron nitrate, iron sulfate and the like, for example as disclosed in U.S. Pat. No. 9,242,238, which is incorporated by reference herein in its entirety. For instance, a $Na^+$, $NH_4^+$ or $H^+$ form of a molecular sieve is mixed with an aqueous salt solution and agitated at an elevated temperature for a suitable time. The slurry is filtered and the filter cake is washed and dried.

Iron addition comprises for instance ion-exchange processes, impregnation of an iron salt or mixing a molecular sieve with iron oxide. Suitable iron-containing molecular sieves are disclosed for instance in U.S. Pat. No. 9,011,807, which is incorporated by reference herein in its entirety.

The amount of base metal in the molecular sieve is for example from about 0.1, about 0.3, about 0.5, about 0.7, about 1.0 or about 1.5 to about 3.0, about 4.0 wt. %, about 5.0, about 6.0, about 7.0, about 8.0, about 9.0 or about 10 wt. % (weight percent), based on the total weight of the metal-containing molecular sieve. The amount of base metal is measured and reported as the oxide.

The base metal-containing molecular sieve is present on the substrate at a loading (concentration) of, for instance, from about 0.3 g/in$^3$ to about 4.5 g/in$^3$, or from about 0.4 g/in$^3$, about 0.5 g/in$^3$, about 0.6 g/in$^3$, about 0.7 g/in$^3$, about 0.8 g/in$^3$, about 0.9 g/in$^3$ or about 1.0 g/in$^3$ to about 1.5 g/in$^3$, about 2.0 g/in$^3$, about 2.5 g/in$^3$, about 3.0 g/in$^3$, about 3.5 g/in$^3$ or about 4.0 g/in$^3$ based on the substrate. This refers to dry solids weight per volume of substrate, for example, per volume of a honeycomb monolith. An amount of base metal per volume would, for instance, be from about 0.2% to about 10% of the above values. An amount of base metal per volume is the base metal concentration. An amount of a base metal-containing molecular sieve per volume is the molecular sieve concentration. Concentration is based on a cross-section of a substrate or on an entire substrate.

A method for activating an iron-containing molecular sieve includes adding iron into a molecular sieve followed by steam-calcination of the resulting iron-containing molecular sieve powder from about 500° C. to about 800° C. for a period of from about 20 minutes to about 12 hours in the presence of water vapor or from about 650° C. to about 750° C. for a period of from about 20 minutes to about 2 hours in the presence of water vapor. The steam-calcination periods are for example from about 20 minutes to about 1 hour or 1.5 hours. The resulting steam-activated iron-containing molecular sieve powders may be spray-dried or air-dried.

The SCR coating compositions may be zoned and have optional undercoats and/or overcoats. The SCR coating composition may contain more than one coating layer, for example the first SCR catalyst and the base metal-containing molecular sieve catalyst may be in separate coating layers or in a single coating layer.

Configurations of coating layers are not limited. For example, the first SCR catalyst and base metal-containing molecular sieve catalyst may each be in a separate coating layer, where the coating layers are in a zone configuration from front to back or are in a configuration from proximal the substrate to distal the substrate or some combination thereof. Alternatively, the functional compositions may be together in one coating layer or in some combination spread over two coating layers.

As noted above, the SCR functional coating may advantageously be "zoned", comprising zoned functional layers. This may also be described as "laterally zoned". For example, a layer may extend from the inlet end towards the outlet end extending about 10%, about 20%, about 30%, about 40%, about 50%, about 60%, about 70%, about 80% or about 90% of the substrate length. Another layer may extend from the outlet end towards the inlet end extending about 10%, about 20%, about 30%, about 40%, about 50%, about 60%, about 70%, about 80% or about 90% of the substrate length. Different coating layers may be adjacent to each other and not overlay each other. Alternatively, different layers may overlay a portion of each other, providing a third "middle" zone. The middle zone may for example extend from about 5% to about 80% of the substrate length, for example about 5%, about 10%, about 20%, about 30%, about 40%, about 50%, about 60% or about 70% of the substrate length. In one embodiment, the first SCR composition is laterally zoned proximal to the inlet end and the base metal-containing molecular sieve catalyst composition is laterally zoned proximal to the outlet end.

As noted above, different layers may each extend the entire length of the substrate or may each extend a portion of the length of the substrate and may overlay or underlay each other, either partially or entirely. Each of the different layers may extend from either the inlet or outlet end.

As noted above, different functional SCR compositions may reside in each separate coating layer. The coating composition may comprise 1, 2 or 3 or more coating layers. Any coating layer comprising a present functional composition is a "functional layer".

Different coating layers may be in direct contact with the substrate. Alternatively, one or more "undercoats" may be present, so that at least a portion a functional coating layer or coating layers are not in direct contact with the substrate (but rather with the undercoat). One or more "overcoats" may also be present, so that at least a portion of the functional coating layer or layers are not directly exposed to a gaseous stream or atmosphere (but rather are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer."

An undercoat is a layer "under" a coating layer, an overcoat is a layer "over" a coating layer and an interlayer is a layer "between" two coating layers.

The interlayer(s), undercoat(s) and overcoat(s) may contain one or more functional compositions or may be free of functional compositions.

The present functional coatings may comprise more than one identical layers.

Monolithic Wall-Flow Filter for SCR Composition

The SCR catalyst article may utilize either a flow-through monolith as described above or a wall-flow filter monolith. The wall-flow filter substrate used for the SCR catalyst composition can be made from materials such as cordierite, aluminum titanate, silicon carbide, silicon titanate, metals or metal foams.

Wall-flow filter substrates useful for supporting the SCR functional coating(s) have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 900 or more flow passages (or "cells") per square inch of cross-section, although far fewer may be used. For example, the typical carrier usually has from about 100 to about 300, cells per square inch ("cpsi"). The cells can have cross-sections that are rectangular, square, circular, oval, triangular, hexagonal, or are of other polygonal shapes. Wall-flow substrates may have a wall thickness of from about 50 microns to about 500 microns, for example from about 100 microns to about 450 microns or from about 150 microns to about 400 microns. The walls of the wall-flow filters are porous and generally have a wall porosity of at least about 50% or at least about 60% with an average pore size of at least about 5 microns prior to disposition of the functional coating. For instance, the wall-flow filter will have a porosity of ≥50%, ≥60%, ≥65% or ≥70%. For instance, the wall-flow filters will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a functional coating. The terms "wall porosity" and "substrate porosity" mean the same thing and are interchangeable.

Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points.

The present wall-flow filters typically have an aspect ratio (length/diameter or L/D) of from about 1 to about 20, for example from about 1.0, about 2.0, about 3.0, about 3.5, about 4.0, about 4.5, about 5.0 or about 5.5 to about 6.0, about 6.5, about 7.0, about 7.5, about 8.0, about 8.5, about 9.0, about 9.5, about 10.0, about 11.0, about 12.0, about 13.0, about 14.0, about 15.0, about 16.0, about 17.0, about 18.0, about 19.0 or about 20.0. For instance, the wall-flow filters may have an aspect ratio of from about 3 to about 10.

A wall-flow filter and wall-flow filter section are shown in FIGS. 1a and 1b, respectively. The wall-flow filter shown in FIG. 1a has an axial length L and diameter D. The alternating blocked ("plugged") passages are seen in the checkerboard face pattern in FIG. 1a. Alternating plugged and open passages (cells) are seen in the cross-section view of a section of a wall-flow filter in FIG. 1b. Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls. The dark squares in FIG. 1a are plugged ends 100 and white squares are open ends 101.

Catalyzed wall-flow filters are disclosed for instance in U.S. Pat. No. 7,229,597, which is hereby incorporated by reference in its entirety. This reference teaches a method of applying a catalytic coating such that the coating permeates the porous walls, that is, is dispersed throughout the walls. Flow-through and wall-flow substrates are also taught for example in U.S. Pat. App. No. 62/072,687, published as WO2016/070090, hereby incorporated by reference in its entirety.

The SCR functional coating may be on the substrate wall surfaces and/or in the pores of the filter walls, that is "in" and/or "on" the filter walls. Thus, the phrase "a catalytic coating disposed on the substrate" means on any surface, for example on a wall surface and/or on a pore surface. The functional coating may be on and/or in only one side of the cell walls, that is only on and/or in the inlet or outlet sides. Alternatively, the functional coating may be disposed on both the inlet and outlet sides of the walls.

The present wall-flow filter has high porosity, allowing high loadings of catalyst compositions without excessive backpressure during operation. The wall-flow filter optionally has a high aspect ratio, which will allow it to be fitted in a close-coupled position close to the engine. This allows for fast heat-up of the catalyst; the exhaust gas will heat up the catalyst to the operating (catalytic) temperature faster than if it were in an under-floor position. Metallic substrates are advantageously employed in a close-coupled position, allowing for fast heat-up.

The wall-flow filter may have a volume of, for instance, from about 50 $cm^3$, about 100 $cm^3$, about 200 $cm^3$, about 300 $cm^3$, about 400 $cm^3$, about 500 $cm^3$, about 600 $cm^3$, about 700 $cm^3$, about 800 $cm^3$, about 900 $cm^3$ or about 1000 $cm^3$ to about 1500 $cm^3$, about 2000 $cm^3$, about 2500 $cm^3$, about 3000 $cm^3$, about 3500 $cm^3$, about 4000 $cm^3$, about 4500 $cm^3$ or about 5000 $cm^3$.

Figure 2B:
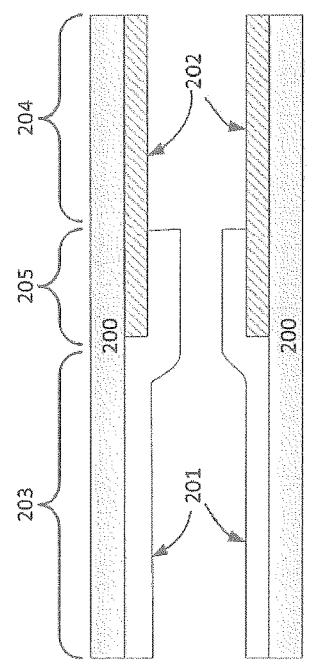
Figure 2C:
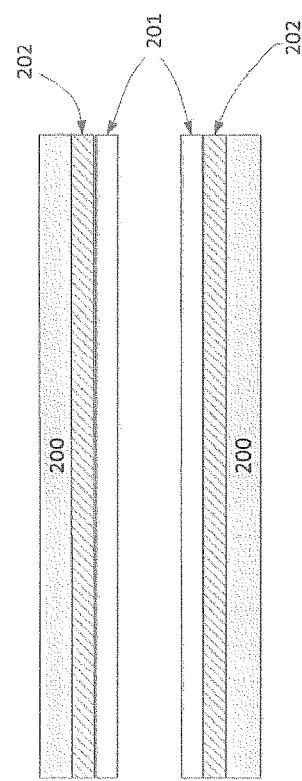

FIGS. 2a, 2b and 2c show some possible coating layer configurations with two SCR coating layers. Shown are substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 2a, coating layer 201 (e.g., the first SCR catalyst) extends from the inlet to the outlet about 50% of the substrate length; and coating layer 202 (e.g., base metal-containing molecular sieve SCR catalyst) the extends from the outlet to the inlet about 50% of the substrate length and the coating layers are adjacent each other, providing an inlet upstream zone 203 and an outlet downstream zone 204. In FIG. 2b, coating layer 202 (e.g., base metal-containing molecular sieve SCR catalyst) extends from the outlet about 50% of the substrate length and layer 201 (e.g., the first SCR catalyst) extends from the inlet greater than 50% of the length and overlays a portion of layer 202, providing an upstream zone 203, a middle zone 205 and a downstream zone 204. In FIG. 2c, coating layers 201 and 202 each extend the entire length of the substrate with layer 201 overlaying layer 202. The substrate of FIG. 2c does not contain a zoned coating configuration. FIGS. 2a, 2b and 2c may be useful to illustrate coating compositions on the wall-through substrate or the flow-through substrate.

The functional coating, as well as each zone of a functional coating or any section of a coating, is present on the wall-flow filter substrate at a loading (concentration) of for instance from about 3.0 $g/in^3$ to about 6.0 $g/in^3$, or from about 3.2 $g/in^3$, about 3.4 $g/in^3$, about 3.6 $g/in^3$, about 3.8 $g/in^3$, about 4.0 $g/in^3$, about 4.2 $g/in^3$ or about 4.4 $g/in^3$ to about 4.6 $g/in^3$, about 4.8 $g/in^3$, about 5.0 $g/in^3$, about 5.2 $g/in^3$, about 5.4 $g/in^3$, about 5.6 $g/in^3$, about 5.8 $g/in^3$, or about 6.0 $g/in^3$ based on the wall-flow substrate. This refers to dry solids weight per volume of the wall-flow substrate. Concentration is based on a cross-section of a substrate or on an entire substrate.

The first SCR catalyst and the base metal-containing molecular sieve SCR catalyst are present in the coating composition at weight levels, for instance, at a weight ratio of from about 1:10, about 1:9, about 1:8, about 1:7, about 1:6, about 1:5, about 1:4, about 1:3, about 1:2 or about 1:1 to about 2:1, about 3:1, about 4:1, about 5:1, about 6:1, about 7:1, about 8:1, about 9:1 or about 10:1.

The present functionalized wall-flow filter article will exhibit excellent backpressure performance, for instance will exhibit an increase in backpressure (or pressure drop) of ≤25%, ≤20%, ≤15%, ≤10%, ≤9%, ≤8% or ≤7%, compared to the same article not having the functional coating compositions disposed thereon.

EXPERIMENTAL

Example 1

DOC Article

A bottom coat catalyst slurry containing milled alumina powder impregnated with Pd (0.5 wt. %), Ba (0.8 wt. %) and Pt (0.3 wt. %) is prepared and adjusted to a pH of 4.5 to 5.0 with nitric acid. The bottom coat slurry had a solid content of 38 wt. %. A top coat slurry containing alumina/5 wt. % Mn and Pt-amine (3.3 wt. %) is prepared, milled and adjusted to a pH of 4.5 to 5.0 with nitric acid. The top coat slurry had a solid concentration of 37 wt. %. Zeolite beta (0.35 g/in$^3$) was added to the top coat slurry.

The bottom coat slurry was applied to the entire core length of a 1"×3", 400 cpsi (cells per square inch) honeycomb substrate via a washcoat technique. The coated substrate was air dried at 120° C. and calcined at 500° C. for 1 hour, providing a coating loading of 1.6 g/in$^3$. The top coat slurry was applied over the entire bottom coat and was dried and calcined as the bottom coat, to provide a total coating loading of 2.5 g/in$^3$ and a Pt/Pd weight ratio of 3/1.

Example 2

SCRoF Article

A catalyst slurry containing milled CuCHA (3.3 wt. % Cu) and 5 wt. % zirconium acetate binder was prepared and applied via a washcoat technique to a 300/12, 1" dia×5.5" length honeycomb substrate filter with alternate channel openings having a volume of 70.8 cm$^3$. The coated core was dried at 130° C. and calcined at 550° C. for 1 hour to provide a coating loading of 1.75 g/in$^3$.

Example 3

Pollution Abatement

The coated DOC article of Example 1 is hydrothermally aged in a tube furnace at 800° C. for 16 hours with a feed gas composition of 10% $H_2O$, 10% $O_2$, balance $N_2$. The SCRoF article is fresh. Samples are evaluated in a lab reactor equipped to conduct a simulated NEDC (New European Driving Cycle) with a separate feed line for $H_2/N_2$ serving as the source for $H_2$ pulse, just in front of the DOC. $NH_3$ was injected prior to SCRoF at $NH_3/NO_x$ ratio=1 on a second-by-second basis. Engine out temperature traces between vehicle and simulator are provided in FIG. 5, and engine out CO emissions between the vehicle trace and simulator are provided in FIG. 6. Hydrogen injection impact was evaluated for the DOC only and for the DOC+SCRoF system, with a sampling line taken between the DOC and SCRoF, as well as a second sampling line after the combined system. The SCRoF article was downstream of the DOC article.

Hydrogen was pulsed into the exhaust stream during the first 200 or 300 seconds with a hydrogen concentration in a feed gas of 1%. Hydrogen injection was performed via a separate (non-preheated) line in a $H_2/N_2$ feed gas. The first 200 or 300 seconds represented a cold-start period.

Results for % conversion of CO, HC and $NO_x$, along with $NO_2/NO_x$ value, for the DOC article only are set forth in Table 1 below.

TABLE 1

|  |  | CO | HC | NOx | $NO_2/NO_x$ |
|---|---|---|---|---|---|
|  | no $H_2$ | 49 | 64 | 7 | 25 |
| 0-200 sec | 1% $H_2$ | 65 | 80 | 10 | 27 |
| 0-300 sec | 1% $H_2$ | 77 | 87 | 13 | 29 |

Results for % conversion of CO, HC and $NO_x$ on the DOC+SCRoF system are set forth in Table 2 below.

TABLE 2

|  |  | CO | HC | $NO_x$ |
|---|---|---|---|---|
|  | no $H_2$ | 52 | 68 | 64 |
| 0-200 sec | 1% $H_2$ | 68 | 83 | 69 |
| 0-300 sec | 1% $H_2$ | 78 | 88 | 73 |

It is clear that small amounts of hydrogen provided significant improvements in CO/HC/$NO_x$ conversions for a DOC article or for a DOC+SCRoF system.

Example 4

Second SCR Article

A catalyst slurry containing milled CuCHA (3.3 wt. % Cu) and 5 wt. % zirconium acetate binder was prepared and applied via a washcoat technique to a 400 cpsi, 1"×5" flow-through honeycomb substrate having a volume of 64.4 cm$^3$. The coated core was dried at 130° C. and calcined at 550° C. for 1 hour to provide a coating loading of 2.85 g/in$^3$.

Example 5

Pollution Abatement with Second SCR Article

The same coated DOC article from Example 1 was hydrothermally aged in a tube furnace at 800° C. for 16 hours with a feed gas composition of 10% $H_2O$, 10% $O_2$, balance $N_2$. The second SCR article was fresh. Samples were evaluated in a lab reactor equipped to conduct a simulated NEDC (New European Driving Cycle) as described in Example 3, with a separate feed line for $H_2/N_2$ serving as the source for $H_2$ pulse, just in front of the DOC. Hydrogen injection impact was evaluated for the DOC only and for the DOC+SCR system, with a sampling line taken between the DOC and SCR, as well as a second sampling line after the combined system. The second SCR article was downstream of the DOC article.

Hydrogen was pulsed into the exhaust stream during the first 200 or 300 seconds with a hydrogen concentration in a feed gas of 1%. Hydrogen injection was performed via a separate (non-preheated) line in a $H_2/N_2$ feed gas. The first 200 or 300 seconds y represented a cold-start period.

Results for % conversion of CO, HC and $NO_2/NO_x$ on the DOC article only are set forth in Table 3 below.

TABLE 3

|  |  | CO | HC | $NO_2/NO_x$ |
|---|---|---|---|---|
|  | no $H_2$ | 46 | 66 | 24 |
| 0-200 sec | 1% $H_2$ | 59 | 73 | 25 |
| 0-300 sec | 1% $H_2$ | 71 | 79 | 28 |

Results for % conversion of CO, HC and $NO_x$ on the DOC+SCR system are set forth in Table 4 below.

TABLE 4

|  |  | CO | HC | $NO_x$ |
|---|---|---|---|---|
|  | no $H_2$ | 48 | 68 | 86 |
| 0-200 sec | 1% $H_2$ | 63 | 76 | 91 |
| 0-300 sec | 1% $H_2$ | 73 | 81 | 92 |

While CO and HC conversions from the DOC+SCR system were similar to the DOC-alone measurements, the $NO_x$ conversion increased from 86% for a fresh SCR, to 91%, by injection of a $H_2$ pulse for 200 sec. As SCR conversion already reached the >90% range, it was useful to test an aged SCR, as shown in the following example.

Example 6

Pollution Abatement with Second Aged SCR Article

The same coated DOC article from Example 1 was hydrothermally aged in a tube furnace at 800° C. for 16 hours with a feed gas composition of 10% $H_2O$, 10% $O_2$, balance $N_2$. The second SCR article had been aged at 750° C. for 16 hours, with 10% steam in air. Samples were evaluated in a lab reactor equipped to conduct a simulated NEDC (New European Driving Cycle) as described in Example 3, with a separate feed line for $H_2/N_2$ serving as the source for $H_2$ pulse, just in front of the DOC. Hydrogen injection impact was evaluated for the DOC only and for the DOC+SCR system, with a sampling line taken between the DOC and SCR, as well as a second sampling line after the combined system. The SCR article was downstream of the DOC article.

Hydrogen was pulsed into the exhaust stream during the first 200 or 300 seconds with a hydrogen concentration in a feed gas of 1%. Hydrogen injection was performed via a separate (non-preheated) line in a $H_2/N_2$ feed gas. The first 200 or 300 seconds represented a cold-start period.

Results for % conversion of CO, HC and $NO_x$ on the DOC+SCR system are set forth in Table 5 below.

TABLE 5

|  |  | CO | HC | $NO_x$ |
|---|---|---|---|---|
|  | no $H_2$ | 51 | 70 | 78 |
| 0-200 sec | 1% $H_2$ | 66 | 78 | 83 |
| 0-300 sec | 1% $H_2$ | 75 | 83 | 85 |

Again, it is clear that $H_2$ injection in front of the DOC article not only promoted CO/HC performance, it also enhanced the $NO_x$ conversion of the aged SCR article.

Example 7

Hydrogen Injection in Front of Second SCR Article

The same aged SCR article from Example 6 above was used to test whether a hydrogen pulse in front of the second SCR article would have the effect observed in Example 6 above, where the hydrogen was injected in front of the DOC article. Hydrogen was pulsed into the exhaust stream during the first 200 or 300 seconds with a hydrogen concentration in a feed gas of 1%. Hydrogen injection was performed via a separate (non-preheated) line in a $H_2/N_2$ feed gas. The first 200 or 300 seconds represented a cold-start period.

Results for % conversion of CO, HC and $NO_x$ on the DOC+SCR system, with $H_2$ injection in front of the aged SCR article, are set forth in Table 6 below.

TABLE 6

|  |  | CO | HC | $NO_x$ |
|---|---|---|---|---|
|  | no $H_2$ | 51 | 70 | 78 |
| 0-200 sec | 1% $H_2$ | 48 | 69 | 79 |
| 0-300 sec | 1% $H_2$ | 49 | 69 | 78 |

Hydrogen injection in front of an aged SCR had no promotional effect on either CO, HC, or $NO_x$ performance, indicating that the DOC performance had the greatest impact on the down-stream SCR performance.

To confirm the above observations, the same SCR article was tested alone with hydrogen injection in the front of it, and without a DOC in front of the SCR. Results for % conversion of $NO_x$ on the SCR alone setup, with $H_2$ injection in front of the same aged SCR article, are set forth in Table 7 below.

TABLE 7

|  |  | $NO_x$ |
|---|---|---|
|  | no $H_2$ | 61 |
| 0-200 sec | 1% $H_2$ | 60 |
| 0-300 sec | 1% $H_2$ | 58 |

For a fresh SCR article (from Example 5), the $H_2$ injection impact on the SCR alone setup is set forth in Table 8 below.

TABLE 8

|  |  | $NO_x$ |
|---|---|---|
|  | no $H_2$ | 65 |
| 0-200 sec | 1% $H_2$ | 64 |
| 0-300 sec | 1% $H_2$ | 66 |

It is clear that the greatest benefit in reduction of harmful exhaust emissions was derived from the $H_2$ pulse in front of the DOC, and the total DOC+SCR system $NO_x$ performance improvements, observed from the $H_2$ pulse in front of the DOC, was attributed to either the higher DOC-out temperature, or the increased $NO_2$ concentration after the DOC, or the lower CO/HC concentration after the DOC, or the combination of both temperature and concentrations.

What is claimed:

1. An emission control system for treatment of an exhaust gas stream, comprising:
   an oxidation catalyst composition disposed on a substrate in fluid communication with the exhaust gas stream;
   at least one selective catalytic reduction (SCR) composition disposed on a substrate downstream from the oxidation catalyst composition; and
   a hydrogen injection article configured to introduce hydrogen into the exhaust gas stream upstream of the oxidation catalyst composition or downstream of the oxidation catalyst composition and upstream of the at least one SCR composition;
   wherein the at least one SCR composition comprises a first SCR catalyst comprising a platinum group metal component dispersed on a refractory metal oxide support and a second SCR catalyst comprising a base metal-containing molecular sieve.

2. The emission control system of claim 1, wherein the substrate supporting the at least one SCR composition is a flow-through monolith or a monolithic wall-flow filter.

3. The emission control system of claim 1, wherein the at least one SCR composition is selected from a base metal-containing molecular sieve, a platinum group metal component dispersed on a refractory metal oxide support, and combinations thereof.

4. The emission control system of claim 1, wherein the first SCR catalyst comprises rhodium.

5. The emission control system of claim 1, wherein the base metal comprises copper and/or iron.

6. The emission control system of claim 1, wherein the molecular sieve is an 8-ring small pore molecular sieve.

7. The emission control system of claim 1, wherein the molecular sieve is a zeolite having a structure selected from AEI, AFT, AFX, CHA, EAB, ERI, KFI, LEV, SAS, SAT and SAV.

8. The emission control system of claim 1, wherein the molecular sieve is an aluminosilicate zeolite having a CHA crystal structure and a silica-to-alumina ratio of from about 1 to about 1000.

9. The emission control system of claim 1, wherein the base metal is present in the molecular sieve from about 0.1 wt. % to about 10 wt. %, based on the total weight of the base metal-containing molecular sieve.

10. The emission control system of claim 1, wherein the first SCR catalyst comprises a platinum group metal component from about 5 g/ft$^3$ to about 250 g/ft$^3$, based on the volume of the substrate supporting the SCR catalyst composition.

11. The emission control system of claim 1, wherein the first SCR catalyst further comprises an ammonia adsorption component.

12. The emission control system of claim 11, wherein the ammonia adsorption component is a zeolite selected from clinoptilolite, mordenite, and beta zeolite.

13. The emission control system of claim 1, wherein the system does not comprise any further emission treatment units within the emission control system aside from the oxidation catalyst composition disposed on a substrate and the at least one selective catalytic reduction (SCR) composition disposed on a substrate.

14. The emission control system of claim 1, wherein the oxidation catalyst composition comprises a platinum group metal component dispersed on a refractory metal oxide support.

15. The emission control system of claim 14, wherein the oxidation catalyst composition comprises a platinum group metal component in the range of about 5 g/ft$^3$ to about 250 g/ft$^3$, based on the volume of the substrate.

16. The emission control system of claim 1, wherein the system is configured for intermittent introduction of stored hydrogen.

17. The emission control system of claim 1, wherein the system is configured to introduce stored hydrogen during a cold-start period.

18. The emission control system of claim 1, further comprising a hydrogen storage article.

19. The emission control system of claim 1, wherein the substrate supporting the at least one SCR catalyst composition is a monolithic wall-flow filter article comprising a front upstream end and a rear downstream end defining an axial length.

20. The emission control system of claim 19, wherein the at least one SCR catalyst composition comprises a first SCR coating layer comprising the first SCR catalyst and a second SCR coating layer comprising the second SCR catalyst.

21. The emission control system of claim 20, wherein the first SCR coating layer and the second SCR coating layer are zone coated, wherein the first SCR coating layer is proximal to the front upstream end and the second SCR coating layer is proximal to the rear downstream end.

22. The emission control system of claim 19, wherein the monolithic wall-flow filter article has a porosity in the range of from about 50% to about 85%.

23. The emission control system of claim 19, wherein the monolithic wall-flow filter article comprises pores having an average pore size of from about 5 microns to about 100 microns.

24. The emission control system of claim 1, further comprising an injector upstream of and in fluid communication with the at least one selective catalytic reduction (SCR) composition and configured to introduce ammonia or an ammonia precursor upstream of the at least one selective catalytic reduction (SCR) composition.

25. A method of treating an exhaust gas stream, the method comprising:
receiving the exhaust gas stream into an oxidation catalyst article comprising an oxidation catalyst composition disposed on a substrate in fluid communication with the exhaust gas stream to produce a first effluent;
receiving the first effluent into a selective catalytic reduction (SCR) article comprising at least one SCR composition disposed on a substrate downstream from the oxidation catalyst article; and
intermittently introducing hydrogen upstream of the oxidation catalyst article or downstream of the oxidation catalyst article and upstream of the SCR article;
wherein the at least one SCR composition comprises a first SCR catalyst comprising a platinum group metal component dispersed on a refractory metal oxide support and a second SCR catalyst comprising a base metal-containing molecular sieve.

26. The method of claim 25, wherein said intermittently injecting hydrogen comprising injecting hydrogen during a cold-start period.

27. The method of claim 25, wherein the substrate supporting the at least one SCR composition is a flow-through monolith or a monolithic wall-flow filter.

28. The method of claim 25, wherein the at least one SCR composition is selected from a base metal-containing molecular sieve, a platinum group metal component dispersed on a refractory metal oxide support, and combinations thereof.

* * * * *